United States Patent

Niwa et al.

(10) Patent No.: US 9,361,924 B2
(45) Date of Patent: Jun. 7, 2016

(54) MAGNETIC RECORDING MEDIUM AND MAGNETIC RECORDING AND REPRODUCING APPARATUS

(71) Applicant: SHOWA DENKO K.K., Minato-ku, Tokyo (JP)

(72) Inventors: Kazuya Niwa, Ichihara (JP); Tetsuya Kanbe, Ichihara (JP); Yuji Murakami, Ichihara (JP); Lei Zhang, Ichihara (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/394,958

(22) PCT Filed: May 10, 2013

(86) PCT No.: PCT/JP2013/063136
§ 371 (c)(1),
(2) Date: Oct. 16, 2014

(87) PCT Pub. No.: WO2013/172260
PCT Pub. Date: Nov. 21, 2013

(65) Prior Publication Data
US 2015/0085628 A1  Mar. 26, 2015

(30) Foreign Application Priority Data

May 14, 2012 (JP) ................. 2012-110578
Jun. 26, 2012 (JP) ................. 2012-143084

(51) Int. Cl.
*G11B 5/73* (2006.01)
*G11B 5/65* (2006.01)
(Continued)

(52) U.S. Cl.
CPC ............... *G11B 5/7325* (2013.01); *G11B 5/65* (2013.01); *G11B 5/653* (2013.01); *G11B 5/656* (2013.01);
(Continued)

(58) Field of Classification Search
CPC ............. G11B 5/66; G11B 2005/0021; G11B 2005/0024; G11B 5/1278; G11B 5/65; G11B 5/667; G11B 5/732; G11B 5/7325; G11B 7/257; G11B 5/314; G11B 5/6088; G11B 5/4866; G11B 5/3163; G11B 5/127; G11B 5/3909; G11B 5/3146; G11B 5/3929; G11B 13/04; G11B 5/313; G11B 11/10589; G11B 5/656; G11B 5/653; Y10S 428/90
See application file for complete search history.

(56) References Cited

U.S. PATENT DOCUMENTS 5,082,749 A * 1/1992 Carcia ........................ 428/699
2005/0233174 A1 * 10/2005 Munteanu et al. ............ 428/828
(Continued)

FOREIGN PATENT DOCUMENTS

JP   11-353648 A   12/1999
JP   2004-178753 A   6/2004
(Continued)

OTHER PUBLICATIONS

En Yang et al., "Structure and magnetic properties of L10-FePt thin films on TiN/RuAl underlayers," Journal of Applied Physics, 2011, pp. 07B770-1-07B770-3, vol. 109.
(Continued)

*Primary Examiner* — Dionne H Pendleton
(74) *Attorney, Agent, or Firm* — Sughrue Mion, PLLC (57) ABSTRACT

A thermally-assisted magnetic recording medium or a microwave-assisted magnetic recording medium includes: an orientation control layer (104) that is formed on a substrate (101); an underlayer (10) that is formed on the orientation control layer (104); and a magnetic layer (108) that is formed on the underlayer (10) and contains an alloy having an $L1_0$ type crystal structure as a main component, in which the underlayer (10) includes an MgO underlayer (107) that contains MgO and has a (100) orientation and a nitride underlayer (106) that contains at least one nitride selected from the group consisting of TaN, NbN, and HfN and has a (100) orientation.

9 Claims, 2 Drawing Sheets (51) Int. Cl.
  *G11B 5/66* (2006.01)
  *G11B 11/105* (2006.01)
  *G11B 5/00* (2006.01)

(52) U.S. Cl.
  CPC ............ *G11B 5/66* (2013.01); *G11B 11/10589* (2013.01); *G11B 2005/0021* (2013.01); *G11B 2005/0024* (2013.01)

(56) References Cited

U.S. PATENT DOCUMENTS

| | | | |
|---|---|---|---|
| 2006/0120262 A1* | 6/2006 | Kiyono | 369/275.3 |
| 2007/0053113 A1* | 3/2007 | Papworth Parkin | 360/324.2 |
| 2007/0111035 A1* | 5/2007 | Shimizu et al. | 428/828.1 |
| 2009/0136782 A1* | 5/2009 | Lu | 428/828 |
| 2012/0214021 A1* | 8/2012 | Sayama et al. | 428/836.1 |
| 2013/0170060 A1* | 7/2013 | Johns et al. | 360/31 |

FOREIGN PATENT DOCUMENTS

| | | |
|---|---|---|
| JP | 2008-305486 A | 12/2008 |
| JP | 2009-146558 A | 7/2009 |
| JP | 2011-198455 A | 10/2011 |
| JP | 2012-014750 A | 1/2012 |
| WO | 2005/022565 A1 | 3/2005 |

OTHER PUBLICATIONS

International Search Report of PCT/JP2013/063136 dated Jun. 11, 2013.

* cited by examiner

MAGNETIC RECORDING MEDIUM AND MAGNETIC RECORDING AND REPRODUCING APPARATUS

BACKGROUND OF THE INVENTION

1. Field of the Invention

The present invention relates to a recording medium of thermally-assisted magnetic recording or microwave-assisted magnetic recording, which is used in hard disk drives (HDD) or the like, and a magnetic recording and reproducing apparatus.

This is a National Stage of International Application No. PCT/JP2013/063136 filed May 10, 2013, claiming priority based on Japanese Patent Application No. 2012-110578, filed on May 14, 2012, and Japanese Patent Application No. 2012-143084, filed on Jun. 26, 2012, the contents of which are incorporated herein by reference.

2. Description of Related Art

Recently, the demand for hard disk drives with high capacity has been increasing. However, with the existing recording methods, it is difficult to improve the recording density of hard disk drives. Thermally-assisted magnetic recording is a technique which has been actively studied and attracted attention as a recording method in next generation. In thermally-assisted magnetic recording, a magnetic head irradiates a medium with near-field light to heat a medium surface locally, thereby decreasing the coercive force of the medium to write information thereon.

In thermally-assisted magnetic recording, as a material of a magnetic layer, a high Ku material such as FePt (Ku: $7\times10^7$ erg/cm$^3$) or CoPt (Ku: $5\times10^7$ erg/cm$^3$) having an $L1_0$ type crystal structure is used. When the high Ku material is used as the material of the magnetic layer, KuV/kT (Ku: magnetic anisotropy constant, V: particle volume, k: Boltzmann's constant, T: temperature) increases. Therefore, the magnetic particle volume can decrease without thermal fluctuation being decreased. Due to the refinement of magnetic particles, the transition width can be narrowed in thermally-assisted magnetic recording. As a result, noise can be reduced and the signal-to-noise ratio (SNR) can be improved.

In addition, in order to obtain a thermally-assisted magnetic recording medium having high perpendicular magnetic anisotropy, it is necessary to allow an alloy having an $L1_0$ type crystal structure, which is used as a magnetic layer, to have a high (001) orientation. The orientation of the magnetic layer is controlled by an underlayer. Therefore, it is necessary to appropriately select a material of the underlayer. As a material of the underlayer of the magnetic recording medium, for example, MgO, CrN, or TiN is known in the related art.

For example, Patent Document 1 discloses a technique in which an underlayer containing MgO as a main component is prepared and an ordered alloy layer with an $L1_0$ type crystal structure formed of an FePt alloy is prepared.

In addition, Patent Document 2 discloses a magnetic recording medium, including: an underlayer that is formed of a transition metal nitride such as TiN, ZrN, HfN, or CrN; and a magnetic recording layer that is disposed on the underlayer and includes dots, which is formed of a magnetic material having an $L1_0$ structure such as FePt or CoPt, and a non-magnetic region.

In addition, as an example of a magnetic recording medium which includes plural magnetic underlayers, NPL 1 discloses a configuration in which a FePt magnetic layer exhibits a high (001) orientation by using a RuAl underlayer and a TiN underlayer. RuAl exhibits a (100) orientation due to its B2 structure. TiN has a NaCl structure as in the case of MgO and also has a lattice constant similar to that of MgO. Therefore, TiN can make a FePt magnetic layer have a (001) orientation as in the case of MgO.

In addition, another technique which has attracted attention as a next-generation recording method is microwave-assisted magnetic recording. In microwave-assisted magnetic recording, a magnetic layer of a magnetic recording medium is irradiated with microwaves to incline a magnetization direction from a magnetization easy axis and to locally reverse the magnetization of the magnetic layer, thereby recording magnetic information.

PRIOR ART DOCUMENTS

Patent Documents

[Patent Document 1] Japanese Unexamined Patent Application, First Publication No. H11-353648

[Patent Document 2] Japanese Unexamined Patent Application, First Publication No. 2009-146558

Non-Patent Document

[Non-Patent Document 1] J. Appl. Phys., Vol. 109, 07B770 (2011)

SUMMARY OF THE INVENTION

In a thermally-assisted magnetic recording medium, in order to obtain superior magnetic recording properties, it is necessary that the coercive force be improved by allowing a magnetic layer formed of an alloy having an $L1_0$ type crystal structure to have a high (001) orientation. However, with the techniques of the related art, the (001) orientation of a magnetic layer formed of an alloy having an $L1_0$ type crystal structure is insufficient, and further improvement of the orientation of a magnetic layer used in a thermally-assisted magnetic recording medium is required.

In addition, in a microwave-assisted magnetic recording medium, further improvement of the orientation of a magnetic layer formed of an alloy having an $L1_0$ type crystal structure is required. That is, in microwave-assisted magnetic recording, similarly to thermally-assisted magnetic recording, a high Ku material formed of an alloy having an $L1_0$ type crystal structure can be also used as a material of a magnetic layer. In addition, in order to further improve recording density, it is necessary to decrease the size of the particle included in the magnetic layer. Therefore, in microwave-assisted magnetic recording, a magnetic recording medium formed of an alloy having an $L1_0$ type crystal structure, which is capable of maintaining thermal stability even when the particle size of magnetic particles is refined, is also required.

The present invention has been made in consideration of the above-described circumstances, and an object thereof is to provide a thermally-assisted magnetic recording medium and a magnetic recording and reproducing apparatus including the same, the thermally-assisted magnetic recording medium including a magnetic layer that is formed of an alloy having an $L1_0$ type crystal structure, in which high coercive force and high signal-to-noise ratio (SNR) can be obtained by the magnetic layer having a high (001) orientation.

In addition, another object of the present invention is to provide a microwave-assisted magnetic recording medium, the microwave-assisted magnetic recording medium, which includes a magnetic layer that is formed of an alloy having an $L1_0$ type crystal structure, in which the magnetic layer has a high orientation, and a magnetic recording and reproducing apparatus including the microwave-assisted magnetic recording medium.

In order to solve the above-described problems, the present inventors have thoroughly studied focusing on an underlayer to obtain a magnetic layer having an $L1_0$ type crystal structure. As a result, it was found that a magnetic layer having an $L1_0$ type crystal structure which has a high (001) orientation can be obtained by forming an underlayer on an orientation control layer, the underlayer including: an MgO underlayer that contains MgO and has a (100) orientation; and a nitride underlayer that contains at least one nitride selected from the group consisting of TaN, NbN, and HfN and has a (100) orientation, and thereby completing the present invention.

According to the present invention, a magnetic recording medium having the following characteristics is provided.

(1) A magnetic recording medium, including: an orientation control layer that is formed on a substrate; an underlayer that is formed on the orientation control layer; and a magnetic layer that is formed on the underlayer and contains an alloy having an $L1_0$ type crystal structure as a main component, in which the underlayer includes an MgO underlayer that contains MgO and has a (100) orientation and a nitride underlayer that contains at least one nitride selected from the group consisting of TaN, NbN, and HfN and has a (100) orientation, and recording is performed by using thermally-assisted magnetic recording method or microwave-assisted magnetic recording method.

(2) The magnetic recording medium according to (1), in which the MgO underlayer is formed on the nitride underlayer.

(3) The magnetic recording medium according to (1), in which the nitride underlayer is formed on the MgO underlayer.

(4) The magnetic recording medium according to any one of (1) to (3), in which the orientation control layer includes a (100)-oriented BCC underlayer that contains Cr, Mo, Nb, Ta, V, W, or Cr as a main component and has a BCC structure containing at least one element selected from the group consisting of Mn, Mo, Ru, Ti, V, and W.

(5) The magnetic recording medium according to any one of (1) to (4), in which the orientation control layer includes a B2 underlayer that has a B2 structure consisting of NiAl or RuAl.

(6) The magnetic recording medium according to any one of (1) to (5), in which the magnetic layer contains a FePt alloy or a CoPt alloy having an $L1_0$ type crystal structure as a main component and contains at least one oxide or element selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, and C.

(7) A magnetic recording and reproducing apparatus, including: the magnetic recording medium according to any one of (1) to (6); a medium-driving unit that drives the magnetic recording medium in a recording direction; a magnetic head that includes a laser-generating unit, a waveguide, and a near-field light-generating element and performs a recording operation and a reproducing operation on the magnetic recording medium, in which the laser-generating unit heats the magnetic recording medium, the waveguide guides laser light, which is generated from the laser-generating unit, to a tip end portion, and the near-field light-generating element is provided in the tip end portion; a head-moving unit that moves the magnetic head relative to the magnetic recording medium; and a recording and reproducing signal-processing system that inputs a signal to the magnetic head and reproduces a signal output from the magnetic head.

(8) A magnetic recording and reproducing apparatus, including: the magnetic recording medium according to any one of (1) to (6); a medium-driving unit that drives the magnetic recording medium in a recording direction; an element that irradiates the magnetic recording medium with microwaves; a magnetic head that performs a recording operation and a reproducing operation on the magnetic recording medium; a head-moving unit that moves the magnetic head relative to the magnetic recording medium; and a recording and reproducing signal-processing system that inputs a signal to the magnetic head and reproduces a signal output from the magnetic head.

A magnetic recording medium according to the present invention includes an orientation control layer that is formed on a substrate, an underlayer that is formed on the orientation control layer, and a magnetic layer that is formed on the underlayer and contains an alloy having an $L1_0$ type crystal structure as a main component. The underlayer includes an MgO underlayer that contains MgO and has a (100) orientation and a nitride underlayer that contains at least one nitride selected from the group consisting of TaN, NbN, and HfN and has a (100) orientation. Therefore, the magnetic layer has a high (001) orientation. Accordingly, the magnetic recording medium according to the present invention exhibits high coercive force and high signal-to-noise ratio (SNR).

DETAILED DESCRIPTION OF THE INVENTION

Hereinafter, embodiments of the present invention will be described in detail. The present invention is not limited to the following examples. Without particular limitation, amounts, configurations, positions, materials, and the like may be modified.

[Thermally-Assisted Magnetic Recording Medium]

Figure 1:
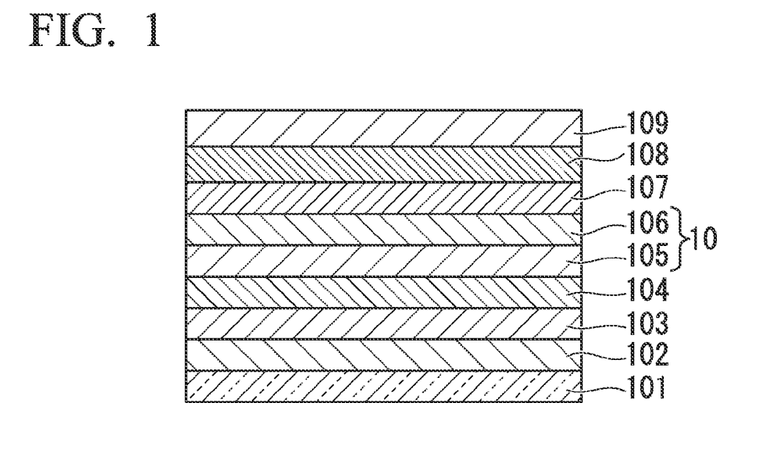
FIG. 1 is a cross-sectional view illustrating an example of a thermally-assisted magnetic recording medium according to the present invention.

FIG. 1 is a cross-sectional view illustrating an example of a thermally-assisted magnetic recording medium according to the present invention.

In a thermally-assisted magnetic recording medium illustrated in FIG. 1, an adhesive layer 102, a heat sink layer 103, a seed layer 104, a BCC underlayer 105 (orientation control layer), an underlayer 10, a magnetic layer 108, a protective film 109, and a lubricant layer 110 are laminated on a substrate 101 in this order. The magnetic layer 108 contains an alloy having an $L1_0$ type crystal structure as a main component.

(Substrate)

As the substrate 101 used in the thermally-assisted magnetic recording medium according to the present invention, for example, a circular non-magnetic substrate can be used. As the non-magnetic substrate, for example, glass, aluminum, or ceramics can be used. As the glass substrate, crystallized glass, amorphous glass, or tempered glass can be used.

It is preferable that the substrate 101 used in the thermally-assisted magnetic recording medium has a high glass transition point and high heat resistance. The material for the substrate 101 can be appropriately determined by considering the conditions of forming each layer on the substrate 101, using the thermally-assisted magnetic recording medium, and others, and thereby selecting the surface roughness, heat capacity, crystal state, and others.

(Adhesive Layer)

The adhesive layer 102 is optionally provided to improve adhesion between the heat sink layer 103 and the substrate 101. Examples of a material of the adhesive layer 102 include CrTi and NiTa.

(Heat Sink Layer)

The heat sink layer 103 is optionally provided to rapidly dissipate heat accumulated in the magnetic layer 108 after recording. Examples of a material of the heat sink layer 103 include one element selected from among Ag, Al, Cu, W, and Mo; and an alloy with high thermal conductivity containing the above element as a main component. When the heat sink layer 103 is provided between the substrate 101 and the magnetic layer 108, it is preferable that the thickness of the underlayer 10 be reduced as small as possible within a range that can secure the effect of controlling the orientation of the underlayer 10 on the magnetic layer 108. By reducing the thickness of the underlayer 10, the distance between the heat sink layer 103 and the magnetic layer 108 can be reduced, the heat dissipation effect of the heat sink layer 103 can be improved, and the transition width can be allowed to be steep.

(Seed Layer)

The seed layer 104 is an underlayer for canceling the orientation of the heat sink layer 103 and allowing the BCC underlayer 105 positioned above the seed layer 104 to have a high (100) orientation. The seed layer 104 is not necessarily provided when a layer positioned immediately below the seed layer 104 exhibits a (100) orientation and the BCC underlayer 105 positioned above the seed layer 104 exhibits a high (100) orientation. In the case of the thermally-assisted magnetic recording medium illustrated in FIG. 1, since the heat sink layer 103 exhibits a (111) orientation, the seed layer 104 composed of CrTi is formed to cancel this (111) orientation. Examples of a material of the seed layer 104 include a soft magnetic layer such as CrTi, NiTa, or AlTi.

(BCC Underlayer)

The BCC underlayer 105 is formed as the orientation control layer that controls the orientation of the magnetic layer 108.

The BCC underlayer 105 contains Cr, Mo, Nb, Ta, V, W, or Cr as a main component, the BCC underlayer 105 has a BCC structure containing at least one element selected from the group consisting of Mn, Mo, Ru, Ti, V, and W, and is (100)-oriented. In addition, the BCC underlayer 105 functions as an underlayer for forming a (100)-oriented nitride underlayer 106. Alternatively, the BCC underlayer 105 may function as an underlayer for forming a (100)-oriented MgO underlayer 107.

In the thermally-assisted magnetic recording medium illustrated in FIG. 1, by forming the (100)-oriented BCC underlayer 105, the nitride underlayer 106 formed on the BCC underlayer 105 is (100)-oriented. The BCC underlayer 105 is provided such that the nitride underlayer 106 which is well (100)-oriented is easily formed to improve a function of controlling the orientation of the magnetic layer 108 by the nitride underlayer 106.

In addition, in the thermally-assisted magnetic recording medium according to the present invention, instead of the BCC underlayer 105, a B2 underlayer having a B2 structure such as RuAl or NiAl may be arranged as the orientation control layer. The B2 underlayer exhibits a (100) orientation due to its B2 structure. Therefore, the B2 underlayer functions as an underlayer for forming the (100) oriented nitride underlayer 106 as in the case of the BCC underlayer 105. The B2 underlayer may function as an underlayer for forming the (100)-oriented MgO underlayer 107.

In addition, in the thermally-assisted magnetic recording medium according to the present invention, optionally, multiple BCC underlayers and/or B2 underlayers may be provided as the orientation control layer.

The BCC underlayer 105 and the B2 underlayer can be formed by using a DC discharge deposition method. As a result, the thicknesses of the BCC underlayer 105 and the B2 underlayer can be increased easily as compared to the nitride underlayer 106 and the MgO underlayer 107. Therefore, among layers for controlling orientation, the BCC underlayer 105 and the B2 underlayer are preferably used as layers arranged closest to the substrate 101 side.

(Underlayer)

Mainly, the underlayer 10 controls the grain size, crystal orientation, flatness, and the like of the magnetic layer 108 and improves the performance of the magnetic layer 108.

In the thermally-assisted magnetic recording medium illustrated in FIG. 1, the underlayer 10 is formed on the BCC underlayer 105, in which the nitride underlayer 106 and the MgO underlayer 107 are laminated in this order.

In the thermally-assisted magnetic recording medium illustrated in FIG. 1, the underlayer 10 is formed between the BCC underlayer 105 and the magnetic layer 108. Therefore, when the BCC underlayer 105 is formed of Cr or contains Cr as a main component, the underlayer 10 is preferably used because Cr diffused from the BCC underlayer 105 to the magnetic layer 108 can be prevented from disturbing the orientation of the magnetic layer 108 or causing noise of the thermally-assisted magnetic recording medium.

(Nitride Underlayer)

The nitride underlayer 106 contains at least one nitride selected from the group consisting of TaN, NbN, and HfN. TaN, NbN, and HfN have a (100)-oriented NaCl structure. The nitride underlayer 106 functions as an underlayer for forming the (100)-oriented MgO underlayer 107. In the underlayer 10 illustrated in FIG. 1, by forming the (100)-oriented nitride underlayer 106, the MgO underlayer 107 formed on the nitride underlayer 106 is (100)-oriented.

TaN, NbN, and HfN having a (100)-oriented NaCl structure has a small lattice mismatch, which is less than 20%, to the alloy having an $L1_0$ type crystal structure used in the magnetic layer 108. Therefore, by forming the magnetic layer 108 on the nitride underlayer 106, the magnetic layer 108 can be allowed to have a high (001) orientation. When a layer, such as the MgO underlayer 107, having the effect of controlling the orientation of the nitride underlayer 106 on the magnetic layer 108 is arranged between the nitride underlayer 106 and the magnetic layer 108, the orientation control effect of the nitride underlayer 106 can be obtained. In the underlayer 10 illustrated in FIG. 1, the MgO underlayer 107 is formed on the (100)-oriented nitride underlayer 106 and thus is (100)-oriented.

In order to efficiently control the orientation of the MgO underlayer 107, it is preferable that the nitride underlayer 106 contain TaN, NbN, and HfN having a NaCL structure in which a ratio of metal to nitrogen is 1:1. However, a nitride in which a ratio of metal to nitrogen is not 1:1 may be mixed in a small amount.

In addition, in order to obtain the magnetic layer 108 exhibiting uniform and superior orientation, the thickness of the nitride underlayer 106 is preferably in a range of 0.5 nm to 30 nm. When the thickness of the nitride underlayer 106 is less than the above-described range, the function of controlling the orientation of the MgO underlayer 107 and the orientation of the magnetic layer 108 arranged on the MgO underlayer 107 is not sufficiently obtained, and it is difficult to obtain the good (001) orientation of the magnetic layer 108. In addition, when the thickness of the nitride underlayer 106 is more than the above-described range, the thickness of the nitride underlayer 106 is likely to be non-uniform. As a result, the flatness of the MgO underlayer 107 and the magnetic layer 108 which are formed on the nitride underlayer 106 is likely to be insufficient.

(MgO Underlayer)

The MgO underlayer 107 contains MgO and has a (100)-oriented NaCl structure. The lattice constant of MgO approximates the a axis length of the magnetic layer 108 containing the alloy having an $L1_0$ type crystal structure as a main component. Specifically, the lattice constant of MgO having a NaCl structure is 0.421 nm, the a axis length of FePt having an $L1_0$ type crystal structure which is used as a main component of the magnetic layer 108 is 0.385 nm, and the a axis length of CoPt having an $L1_0$ type crystal structure is 0.381 nm. Therefore, by forming the magnetic layer 108 containing an FePt alloy or a CoPt alloy as a main component on the MgO underlayer 107, the magnetic layer 108 can be allowed to have a high (001) orientation. In addition, the MgO underlayer 107 has a smaller lattice mismatch to the alloy having an $L1_0$ type crystal structure used in the magnetic layer 108 than the nitride underlayer 106.

When a layer, such as the nitride underlayer 106, for delivering the orientation control effect of the MgO underlayer 107 to the magnetic layer 108 is arranged between the MgO underlayer 107 and the magnetic layer 108, the effect of controlling the orientation of the MgO underlayer 107 can be obtained.

In addition, in order to obtain the magnetic layer 108 exhibiting uniform and high orientation, the thickness of the MgO underlayer 107 is preferably in a range of 0.5 nm to 15 nm. When the thickness of the MgO underlayer 107 is less than the above-described range, the function of controlling the orientation of the magnetic layer 108 can not be obtained sufficiently, and it is difficult to obtain the accurately controlled (001) orientation of the magnetic layer 108. In addition, when the thickness of the MgO underlayer 107 is more than the above-described range, the thickness of the MgO underlayer 107 is likely to be non-uniform. As a result, the flatness of the magnetic layer 108 formed on the MgO underlayer 107 is likely to be insufficient.

(Method of Forming Underlayer)

Next, as an example of a method of forming the underlayer, a method of forming the underlayer 10 illustrated in FIG. 1 will be described.

In order to form the underlayer 10 illustrated in FIG. 1, first, the (100)-oriented BCC underlayer 105 (orientation control layer) which functions as the underlayer of the nitride underlayer 106 is provided on the substrate 101 such that a nitride film which forms the nitride underlayer 106 is (100)-oriented.

Specifically, the (100)-oriented BCC underlayer 105 can be formed, for example, by using a method in which a Cr film is formed on the substrate 101 heated to about 250° C.

Next, by forming the nitride underlayer 106 on the BCC underlayer 105 by epitaxial growth, the (100)-oriented nitride underlayer 106 can be obtained. The nitride underlayer 106 can be formed, for example, using a RF discharge deposition method in which a nitride target is used or a DC discharge deposition method in which each metal target and gas containing $N_2$ are used. The nitride underlayer 106 obtained as above has a small lattice mismatch of less than 20% to the magnetic layer 108 formed on the nitride underlayer 106. Accordingly, by forming the magnetic layer 108 on the nitride underlayer 106, crystal of the magnetic layer 108 can be efficiently controlled.

Next, by making an MgO film be epitaxially grown on the nitride underlayer 106, the MgO underlayer 107 is formed. As a result, the underlayer 10 illustrated in FIG. 1 is formed. The obtained MgO underlayer 107 is (100)-oriented due to the effect of the controlling orientation from the nitride underlayer 106.

On the underlayer 10 which is formed on the orientation control layer as described above, the magnetic layer 108 is formed, for example, by using the following method.

That is, the substrate 101 where the underlayer 10 is formed is heated to 450° C. to 700° C. so that a FePt film which forms the magnetic layer 108 is epitaxially grown. In this embodiment, due to the orientation control effect of the underlayer 10, the magnetic layer 108 which is formed of FePt having an $L1_0$ type crystal structure and exhibits a high (001) orientation can be formed.

It is presumed that the effect of controlling the orientation of the underlayer 10 on the magnetic layer 108 efficiently functions by a difference in lattice constant between the nitride underlayer 106 and the MgO underlayer 107 which are formed as the underlayer 10. Accordingly, when the nitride underlayer 106 and the MgO underlayer 107 are provided as the underlayer 10, the magnetic layer 108 having a more accurately controlled (001) orientation can be formed as compared to a case where an underlayer including plural layers having the same lattice constant is provided.

Other Examples

The thermally-assisted magnetic recording medium according to the present invention needs to include at least the orientation control layer, the underlayer 10 that is formed on the orientation control layer, and the magnetic layer 108 that is formed on the underlayer 10. The lamination order and the number of layers included in the underlayer 10 can be arbitrarily selected according to the design and are not limited to the example illustrated in FIG. 1.

Specifically, for example, in the underlayer 10, as illustrated in FIG. 1, the nitride underlayer 106 and the MgO underlayer 107 may be laminated on the BCC underlayer 105 in this order, or two or more MgO underlayers 107 and/or two or more nitride underlayers 106 may be laminated on the BCC underlayer 105.

When the MgO underlayer 107 is formed on the nitride underlayer 106 as illustrated in FIG. 1, the distance between the MgO underlayer 107 and the magnetic layer 108 is short. Therefore, the effect of controlling the orientation of the MgO underlayer 107 on the magnetic layer 108 can function more efficiently. In addition, the MgO underlayer 107 has a small lattice mismatch to the magnetic layer 108 than the nitride underlayer 106. Therefore, by laminating the nitride underlayer 106, the MgO underlayer 107, and the magnetic layer 108 in this order, the lattice mismatch between the orientation control layer (in FIG. 1, the BCC underlayer 105), which is formed below the nitride underlayer 106, and the magnetic layer 108 can be eliminated in stages. As a result, a synergistic effect of the orientation control function by the nitride underlayer 106 and the MgO underlayer 107 can be more efficiently obtained, and the orientation of the magnetic layer 108 can be further improved. Accordingly, in order to obtain a thermally-assisted magnetic recording medium having high coercive force and high signal-to-noise ratio (SNR), it is preferable that the MgO underlayer 107 be formed on the nitride underlayer 106.

In addition, when the nitride underlayer 106 is formed on the MgO underlayer 107, the distance between the nitride underlayer 106 and the magnetic layer 108 is short. Therefore, the effect of controlling the orientation of the nitride underlayer 106 on the magnetic layer 108 functions more effectively. The nitride underlayer 106 has a larger lattice mismatch to the magnetic layer 108 than the MgO underlayer 107, but a high (100) orientation is maintained. Therefore, the orientation of the magnetic layer 108 can be improved, and high coercive force and sufficient SNR can be obtained.

In addition, since the MgO underlayer 107 is water-soluble, corrosion is likely to occur in a high-temperature and high-humidity condition. When the nitride underlayer 106 is formed on the MgO underlayer 107, the MgO underlayer 107 is protected by the nitride underlayer 106. Therefore, generation of the corrosion in a high-temperature and high-humidity condition is prevented, and corrosion characteristic is superior.

In addition, in the present invention, in order to improve write characteristics of the thermally-assisted magnetic recording medium, a soft magnetic underlayer may be formed between the substrate 101 and the orientation control layer 105 illustrated in FIG. 1.

When the soft magnetic underlayer is formed between the substrate 101 and the orientation control layer 105, a magnetic field gradient applied to the magnetic layer 108 can increase. When the soft magnetic underlayer is included in a magnetic recording and reproducing apparatus, a magnetic field generated from a magnetic head can be efficiently applied to the magnetic layer 108.

This soft magnetic underlayer may be formed of an amorphous alloy or a microcrystalline or polycrsytalline alloy. Further, the soft magnetic underlayer may be a laminated soft magnetic underlayer having an antiferromagnetic coupling with Ru or may be a single layer. Specific examples of a material of the soft magnetic underlayer include CoFeB, CoFeTa, CoFeTaZr, CoFeZr, CoFeTaB, CoFeNi, CoNiTa, CoTaZr, CoNbZr, CoNiZr, and FeAlSi.

(Magnetic Layer)

The magnetic layer 108 contains an alloy having an $L1_0$ type crystal structure as a main component. In order to achieve high recording density, it is preferable that the magnetic layer 108 be formed of magnetic particles having a particle size of several nanometers which are separated from a grain boundary segregation material. However, in this case, the magnetic layer 108 is thermally unstable due to a decrease in the volume of the magnetic particles. Therefore, in the embodiment, an alloy having an $L1_0$ type crystal structure which has high magnetic anisotropy energy is used as a main component of the magnetic layer 108.

It is preferable that the magnetic layer 108 contains a FePt alloy or a CoPt alloy having an $L1_0$ type crystal structure as a main component and contains at least one oxide or element selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, and C.

In the embodiment, in order to control the size of magnetic particles and exchange coupling between particles, an additive as a segregation material may be added to the alloy having an $L1_0$ type crystal structure such as FePt or CoPt. As the additive, at least one oxide or element selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, and C is used. By the addition of such an additive, the magnetic layer 108 having a granular structure can be obtained. As a result, the exchange coupling between particles can be reduced, magnetic particles can be refined, and the SNR of the thermally-assisted magnetic recording medium can be further improved.

In the present invention, in order to further improve write characteristics of the thermally-assisted magnetic recording medium, a cap layer may be formed on the magnetic layer 108. As the cap layer, an alloy containing Co, Fe, or Ni as a main component can be used. The cap layer may contain other additional elements within a range where ferromagnetism is not lost at room temperature. The cap layer may be a crystalline alloy or an amorphous alloy.

(Protective Film)

It is preferable that the protective film 109 be formed of a material having superior heat resistance. As the protective film 109, a single-layer or multi-layer carbon film or the like can be used. As the carbon film, a film to which hydrogen, nitrogen, or metal is added may be used. The carbon film can be formed using a CVD method or an ion beam method.

(Lubricant Layer)

As the lubricant layer 110, for example, a liquid lubricant layer formed of perfluoropolyether can be used.

The thermally-assisted magnetic recording medium illustrated in FIG. 1 includes: the orientation control layer (in FIG. 1, BCC underlayer 105) that is formed on the substrate 101; the underlayer 10 that is formed on the orientation control layer; and the magnetic layer 108 that is formed on the underlayer 10 and contains an alloy having an $L1_0$ type crystal structure as a main component, in which the underlayer 10 includes the MgO underlayer 107 that contains MgO and has a (100) orientation and the nitride underlayer 106 that contains at least one nitride selected from the group consisting of TaN, NbN, and HfN and has a (100) orientation. Therefore, the magnetic layer 108 has a high (001) orientation.

More specifically, in the thermally-assisted magnetic recording medium according to the embodiment, the orientation of the magnetic layer 108 is controlled with high precision due to the synergistic effect of the following effects: the orientation control effect of the BCC underlayer 105 on the magnetic layer 108; the orientation control effect of the nitride underlayer 106, which has a small lattice mismatch to the magnetic layer 108, on the magnetic layer 108; and the orientation control effect of the MgO underlayer 107, whose lattice constant approximates the a axis length of the magnetic layer 108, on the magnetic layer 108. Therefore, the magnetic layer 108 having a high (001) orientation is obtained. As a result, the thermally-assisted magnetic recording medium according to the present invention exhibits high coercive force and high signal-to-noise ratio (SNR).

In addition, in the thermally-assisted magnetic recording medium according to the embodiment, since the nitride underlayer 106 is formed on the BCC underlayer 105 which is the orientation control layer, the nitride underlayer 106 having a high orientation can be easily obtained. Therefore, the magnetic layer 108 having a high (001) orientation can be formed on the nitride underlayer 106.

In addition, when the MgO underlayer 107 is formed on the BCC underlayer 105, the MgO underlayer 107 having a high orientation can be easily obtained. Therefore, a thermally-assisted magnetic recording medium can be obtained in which the magnetic layer 108 having a high (001) orientation is formed on the MgO underlayer 107.

In the thermally-assisted magnetic recording medium according to the embodiment, even when the B2 underlayer is formed as the orientation control layer, and when the nitride underlayer 106 and the MgO underlayer 107 are formed on the B2 underlayer, the nitride underlayer 106 and the MgO underlayer 107 having a high orientation can be easily obtained, and the magnetic layer 108 having a high (001) orientation can be obtained.

[Microwave-Assisted Magnetic Recording Medium]

The magnetic recording medium according to the present invention can be applied to a microwave-assisted magnetic recording medium.

In the microwave-assisted magnetic recording medium according to the embodiment, for example, a BCC underlayer (orientation control layer), an underlayer, and a magnetic layer are laminated on the substrate in this order. As the BCC underlayer (orientation control layer), the underlayer, and the magnetic layer, those described above in the thermally-assisted magnetic recording medium illustrated in FIG. 1 can be used.

In the microwave-assisted magnetic recording medium, since a surface of the medium is not heated, a heat sink layer is not necessary. In the case of the magnetic recording medium illustrated in FIG. 1, the heat sink layer 103 may be excluded, or the BCC underlayer 105 may be directly formed on the adhesive layer 102.

In the microwave-assisted magnetic recording medium, as in the case of the above-described thermally-assisted magnetic recording medium illustrated in FIG. 1, the magnetic layer which contains an alloy having an $L1_0$ type crystal structure as a main component has a high (001) orientation. Therefore, the microwave-assisted magnetic recording medium according to the embodiment exhibits high coercive force and high signal-to-noise ratio (SNR).

[Magnetic Recording and Reproducing Apparatus]

Figure 3:
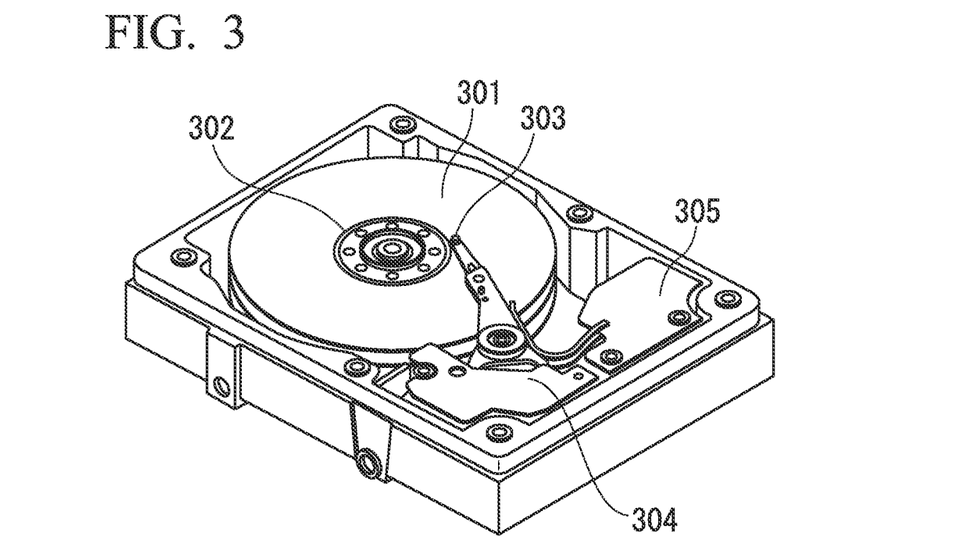
FIG. 3 is a perspective view illustrating an example of a magnetic recording and reproducing apparatus according to the present invention.

Next, a magnetic recording and reproducing apparatus according to the present invention will be described. FIG. 3 is a perspective view illustrating an example of the magnetic recording and reproducing apparatus according to the present invention, and FIG. 4 is a diagram schematically illustrating a configuration of a magnetic head included in the magnetic recording and reproducing apparatus of FIG. 3.

Roughly, the magnetic recording and reproducing apparatus illustrated in FIG. 3 includes: a magnetic recording medium 301 that is the thermally-assisted magnetic recording medium according to the present invention; a medium-driving unit 302 that rotates the magnetic recording medium 301 to be driven in a recording direction; a magnetic head 303 that performs a recording operation and a reproducing operation on the magnetic recording medium 301; a head-moving unit 304 that moves the magnetic head 303 relative to the magnetic recording medium 301; and a recording and reproducing signal-processing system 305 that inputs a signal to the magnetic head 303 and reproduces a signal output from the magnetic head 303.

Figure 4:
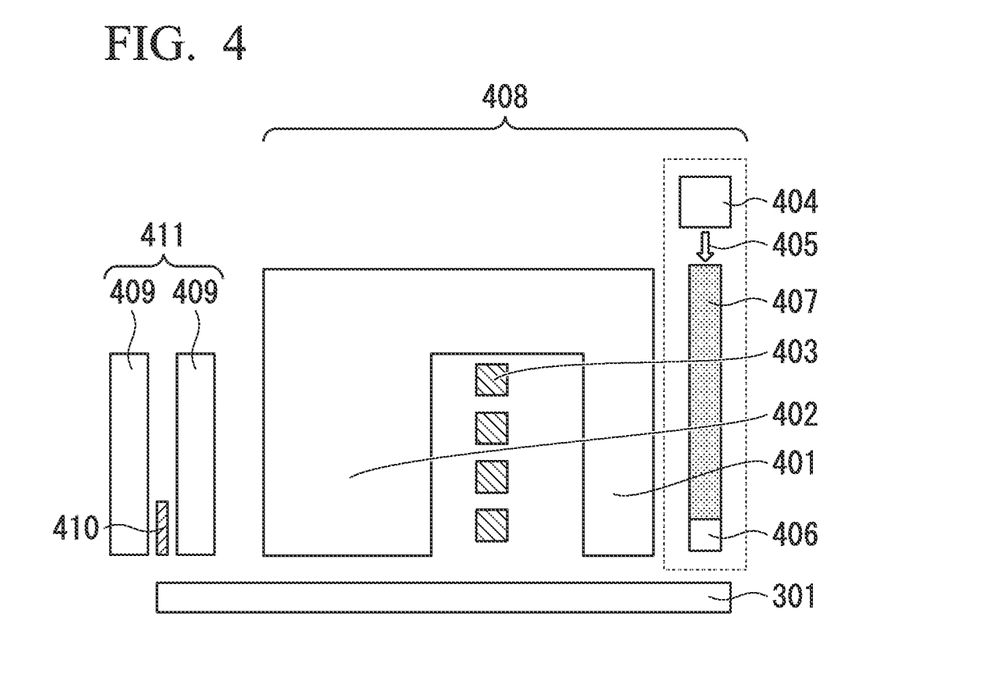
FIG. 4 is a diagram schematically illustrating a configuration of a magnetic head included in the magnetic recording and reproducing apparatus of FIG. 3.

Roughly, as illustrated in FIG. 4, the magnetic head 303 included in the magnetic recording and reproducing apparatus illustrated in FIG. 3 includes a recording head 408 and a reproducing head 411. The recording head 408 includes a main magnetic pole 401, an auxiliary magnetic pole 402, a coil 403 that generates a magnetic field, a laser diode (LD) 404 (laser-generating unit), and a waveguide 407 that guides laser light 405 generated from the LD 404 to a near-field light-generating element 406 provided in a tip end portion. The reproducing head 411 includes a reproducing element 410 such as a TMR element that is interposed between a pair of shields 409.

In the magnetic recording and reproducing apparatus illustrated in FIG. 3, the magnetic recording medium 301 is irradiated with near-field light generated from the near-field light-generating element 406 of the magnetic head 303 to locally heat a surface of the magnetic recording medium 301 and to temporarily decrease the coercive force of the magnetic layer to a head magnetic field or lower, thereby writing information.

Since the magnetic recording and reproducing apparatus illustrated in FIG. 3 includes the magnetic recording medium 301 that is the thermally-assisted magnetic recording medium according to the present invention having high coercive force and high signal-to-noise ratio (SNR), the error rate thereof is low.

[Magnetic Recording and Reproducing Apparatus (Other Examples)]

Next, other examples of the magnetic recording and reproducing apparatus according to the present invention will be described.

The magnetic recording and reproducing apparatus according to the present invention may include a magnetic recording medium that is the microwave-assisted magnetic recording medium. For example, such a magnetic recording and reproducing apparatus includes: a magnetic recording medium that is the microwave-assisted magnetic recording medium; a medium-driving unit that drives the magnetic recording medium in a recording direction; an element that irradiates the magnetic recording medium with microwaves; a magnetic head that performs a recording operation and a reproducing operation on the magnetic recording medium; a head-driving unit that makes the magnetic head move relative to the magnetic recording medium; and a recording and reproducing signal-processing system that inputs a signal to the magnetic head and reproduces a signal output from the magnetic head.

In the magnetic recording and reproducing apparatus including the magnetic recording medium that is the microwave-assisted magnetic recording medium, the magnetic recording medium is irradiated with microwaves from an element for irradiating microwaves. As a result, an alternating magnetic field in a microwave band is applied to the magnetic layer provided in the magnetic recording medium to incline a magnetization direction of it from a magnetization easy axis and to locally reverse the magnetization of the magnetic layer. Thus magnetic information is written by the magnetic head.

Since the magnetic recording and reproducing apparatus includes the magnetic recording medium which is the microwave-assisted magnetic recording medium according to the present invention having high coercive force and high signal-to-noise ratio (SNR), the low error rate thereof and superior recording and reproducing characteristics can be obtained.

EXAMPLES

Hereinafter, the effects of the present invention will be described in more detail using Examples. Examples described below are representative examples for describing the present invention, but the present invention is not limited to these examples.

Examples 1-1 to 1-5

Using the following method, the thermally-assisted magnetic recording medium illustrated in FIG. 1 was prepared.

First, the adhesive layer 102 composed of Cr-50 at % Ti and having a thickness of 40 nm, the heat sink layer 103 composed of Ag and having a thickness of 30 nm, and the seed layer 104 composed of Cr-50 at % Ti and having a thickness of 30 nm were formed on the 2.5-inch glass substrate 101 in this order.

Next, the substrate 101 was heated to 250° C., and the BCC underlayer 105 (orientation control layer; first underlayer) composed of Cr-20 at % V and having a thickness of 30 nm, the nitride underlayer 106 (second underlayer) composed of TaN and having a thickness of 5 nm, and the MgO underlayer 107 (third underlayer) composed of MgO and having a thickness of 5 nm were formed in this order.

Next, the substrate was heated to 680° C., the magnetic layer 108 composed of (Fe-50 at % Pt)-14 mol % $SiO_2$ and having a thickness of 8 nm was formed, the protective film 109 composed of diamond like carbon (DLC) and having a thickness of 3.5 nm was formed on the magnetic layer 108, and the liquid lubricant layer 110 composed of perfluoropolyether and having a thickness of 1.5 nm was coated thereon.

Through the above-described processes, a thermally-assisted magnetic recording medium of Example 1-1 was obtained.

Regarding the thermally-assisted magnetic recording medium of Example 1-1 obtained as above, measurement was performed by X-ray diffraction. As a result, in the magnetic layer, peaks of $L1_0$-FePt(001) and $L1_0$-FePt(002) and a mixed peak of FCC-FePt(200) were found.

In addition, it was found that the BCC underlayer 105 formed of Cr-20 at % V was (100)-oriented, and both the nitride underlayer 106 formed of TaN and the MgO underlayer 107 formed of MgO which were formed on the BCC underlayer 105 were (100)-oriented. It was verified from the above result that the magnetic layer 108 formed of an FePt alloy was epitaxially grown.

Next, thermally-assisted magnetic recording mediums of Examples 1-2 to 1-5 were obtained by replacing the material of the BCC underlayer 105 (orientation control layer; first underlayer) of the thermally-assisted magnetic recording medium of Example 1-1 with Cr-10 at % W (Example 1-2), Cr-15 at % Mo (Example 1-3), Ru-50 at % Al (B2 underlayer; Example 1-4), and Ni-50 at % Al (B2 underlayer; Example 1-5), respectively, and forming the other layers by using the same method in Example 1.

The materials of the orientation control layers (first underlayers), the nitride underlayers (second underlayers), and the MgO underlayers (third underlayers) of Examples 1-1 to 1-5 are shown in Table 1.

TABLE 1

| | First Under-layer | Second Under-layer | Third Under-layer | Coercive force (kOe) | SNR (dB) |
|---|---|---|---|---|---|
| Example 1-1 | Cr-20 at % V | TaN | MgO | 33.9 | 13.2 |
| Example 1-2 | Cr-10 at % W | TaN | MgO | 37.7 | 14.1 |
| Example 1-3 | Cr-15 at % Mo | TaN | MgO | 35.0 | 13.6 |
| Example 1-4 | Ru-50 at % Al | TaN | MgO | 36.2 | 13.7 |
| Example 1-5 | Ni-50 at % Al | TaN | MgO | 35.6 | 13.6 |

Comparative Examples 1-1 to 1-11

Thermally-assisted magnetic recording mediums of Comparative Examples 1-1 to 1-3 were prepared by forming layers, other than the MgO underlayers (third underlayers) of the thermally-assisted magnetic recording mediums of Examples 1-1, 1-2, and 1-4, by using the same method as that of Example 1-1.

In addition, thermally-assisted magnetic recording mediums of Comparative Examples 1-4 to 1-6 were prepared by forming layers, other than the nitride underlayers (second underlayers) of the thermally-assisted magnetic recording mediums of Examples 1-1, 1-2, and 1-4, using the same method as that of Example 1-1.

Further, thermally-assisted magnetic recording mediums of Comparative Examples 1-7 to 1-9 were prepared by forming layers, other than the MgO underlayers and the nitride underlayers of the thermally-assisted magnetic recording mediums of Examples 1-1, 1-2, and 1-4, by using the same method as that of Example 1-1.

In addition, a thermally-assisted magnetic recording medium of Comparative Example 1-10 was prepared by forming layers, other than the BCC underlayer (first underlayer) and the MgO underlayer of the thermally-assisted magnetic recording medium of Example 1-1, by using the same method as that of Example 1-1.

A thermally-assisted magnetic recording medium in Comparative Example 1-11 was prepared by forming layers, other than the BCC underlayer and the nitride underlayer of the thermally-assisted magnetic recording medium of Example 1-1, by using the same method in Example 1-1.

The materials of the orientation control layer (first underlayer), the nitride underlayer (second underlayer), and the MgO underlayer (third underlayer) in Comparative Examples 1-1 to 1-11 are shown in Table 2.

TABLE 2

| | First Under-layer | Second Under-layer | Third Under-layer | Coercive force (kOe) | SNR (dB) |
|---|---|---|---|---|---|
| Comparative Example 1-1 | Cr-20 at % V | TaN | — | 20.2 | 10.2 |
| Comparative Example 1-2 | Cr-10 at % W | TaN | — | 21.8 | 10.5 |
| Comparative Example 1-3 | Ru-50 at % Al | TaN | — | 21.6 | 10.3 |
| Comparative Example 1-4 | Cr-20 at % V | — | MgO | 21.0 | 10.5 |
| Comparative Example 1-5 | Cr-10 at % W | — | MgO | 23.2 | 10.7 |
| Comparative Example 1-6 | Ru-50 at % Al | — | MgO | 22.0 | 10.5 |
| Comparative Example 1-7 | Cr-20 at % V | — | — | 15.5 | 8.0 |
| Comparative Example 1-8 | Cr-10 at % W | — | — | 16.5 | 8.7 |
| Comparative Example 1-9 | Ru-50 at % Al | — | — | 16.2 | 8.5 |
| Comparative Example 1-10 | — | TaN | — | 18.1 | 9.6 |
| Comparative Example 1-11 | — | — | MgO | 18.8 | 9.8 |

Regarding the thermally-assisted magnetic recording mediums of Examples 1-1 to 1-5 and Comparative Examples 1-1 to 1-11, the coercive force and the signal-to-noise ratio (SNR) of electromagnetic conversion characteristics were measured using the following method. The results are shown in Tables 1 and 2.

The coercive force was measured by using a physical property measurement system (PPMS) by applying a magnetic field of 7 T at room temperature. In addition, the SNR of electromagnetic conversion characteristics was measured with a spinstand tester by using a head on which a laser spot heating mechanism was mounted.

As shown in Tables 1 and 2, a high coercive force of 33 kOe or higher was exhibited in all the thermally-assisted magnetic recording mediums of Examples 1-1 to 1-5 in which the orientation control layers were formed of a Cr alloy (BCC underlayer), Ru-50 at % Al (B2 underlayer), and Ni-50 at % Al (B2 underlayer).

The values of coercive force of the magnetic recording medium in Examples 1-1 to 1-5 were more than, by 10 kOe or more, those of the magnetic recording mediums of Comparative Examples 1-1 to 1-11 in which either or both the MgO underlayer and the nitride underlayer were not provided. It was found from the above result that, in Examples 1-1 to 1-5 in which the orientation control layer, the nitride underlayer, and the MgO underlayer were provided and the MgO underlayer was formed on the nitride underlayer, the coercive force can be significantly improved.

In addition, in the thermally-assisted magnetic recording mediums of Examples 1-1 to 1-5, the SNR was 13 dB or higher. This value was higher than 8.0 dB to 10.7 dB of the SNR of the magnetic recording mediums obtained in Comparative Examples 1-1 to 1-11. The reason is presumed to be that the (001) orientation of the magnetic layer 108 was improved by the orientation control layer, the nitride underlayer, and the MgO underlayer.

Examples 2-1 to 2-9

Magnetic recording mediums of Examples 2-1 to 2-3 were prepared by replacing the magnetic layer 108 of the magnetic recording mediums of Examples 1-1, 1-2, and 1-4 with layers formed of (Fe-45 at % Pt-5 at % Ag)-35 mol % C and having a thickness of 9 nm, and forming the other layers by using the same method in Example 1-1.

Next, magnetic recording mediums of Examples 2-4 to 2-6 were prepared by replacing the nitride underlayers (second underlayers) of the thermally-assisted magnetic recording mediums of Examples 2-1 to 2-3 with NbN layers, and forming the other layers by using the same methods as those of Examples 2-1 to 2-3, respectively. In addition, magnetic recording mediums of Examples 2-7 to 2-9 were prepared by replacing the nitride underlayers with MN layers, and forming the other layers by using the same methods in Examples 2-1 to 2-3, respectively.

The materials of the orientation control layer (first underlayer), the nitride underlayer (second underlayer), and the MgO underlayer (third underlayer) of Examples 2-1 to 2-9 are shown in Table 3.

In addition, regarding the thermally-assisted magnetic recording mediums of Examples 2-1 to 2-9, the coercive force and the SNR were measured by using the same method in Example 1-1. The results are shown in Table 3.

In addition, regarding the thermally-assisted magnetic recording mediums of Examples 2-1 to 2-9, the surface roughness (Ra) and the number of particles were measured by using the following method. The results are shown in Table 3.

The surface roughness (Ra) of the magnetic recording medium was measured in a fields of 10 μm square by using a tapping mode of AFM (manufactured by Veeco Instruments Inc.). In the measurement of the number of particles in the magnetic recording medium, the number of particles on a single surface of the magnetic recording medium was measured by using OSA-6100 (manufactured by CANDELA Instruments Inc.).

As shown in Table 3, in all the nitride underlayers formed of TaN, NbN, and HfN, the coercive force and the SNR were high. In addition, when the mediums of Examples 2-1 to 2-3 in which the nitride underlayer was composed of TaN were compared to other examples having the same first underlayer as those of Examples 2-1 to 2-3, it was found that the SNR were higher than those of Examples 2-4 to 2-9 in which the nitride underlayer was formed of NbN or HfN. On the other hand, in the mediums of Examples 2-4 to 2-6 in which the nitride underlayer was composed of NbN, Ra was particularly low, and in the mediums of Examples 2-7 to 2-9 in which the nitride underlayer was composed of MN, the number of particles was particularly small. Based on the above results, the kind of a nitride used in the nitride underlayer can be selected according to the requirements for the magnetic recording medium.

In addition, regarding the orientation control layer (first underlayer), when the Cr alloy having BCC structure was compared to RuAl having a B2 structure, it was found that the coercive force and the SNR were the same and Ra of the Cr alloy having a BCC structure was lower than the others. Based on the above results, the kind of the first underlayer can also be selected according to the requirements for the magnetic recording medium.

Comparative Examples 2-1 to 2-4

Magnetic recording medium of Comparative Examples 2-1 and 2-2 were prepared by replacing the second underlayers of the magnetic recording mediums of Examples 2-1 and 2-3 with the MgO layers and forming the other layers by using the same methods of Examples 2-1 and 2-3, respectively. Further, magnetic recording medium of Comparative

TABLE 3

| | First Underlayer | Second Underlayer | Third Underlayer | Coercive force (kOe) | SNR (dB) | Ra (nm) | Number of Particles |
|---|---|---|---|---|---|---|---|
| Example 2-1 | Cr—20 at % V | TaN | MgO | 34.3 | 13.5 | 0.26 | 117 |
| Example 2-2 | Cr—10 at % W | TaN | MgO | 38.0 | 14.3 | 0.25 | 121 |
| Example 2-3 | Ru—50 at % Al | TaN | MgO | 36.9 | 14.0 | 0.28 | 115 |
| Example 2-4 | Cr—20 at % V | NbN | MgO | 32.2 | 12.8 | 0.18 | 104 |
| Example 2-5 | Cr—10 at % W | NbN | MgO | 35.1 | 13.5 | 0.18 | 110 |
| Example 2-6 | Ru—50 at % Al | NbN | MgO | 33.8 | 13.1 | 0.20 | 108 |
| Example 2-7 | Cr—20 at % V | HfN | MgO | 32.4 | 12.8 | 0.25 | 35 |
| Example 2-8 | Cr—10 at % W | HfN | MgO | 35.3 | 13.4 | 0.25 | 37 |
| Example 2-9 | Ru—50 at % Al | HfN | MgO | 34.7 | 13.0 | 0.27 | 41 |

Examples 2-3 and 2-4 were prepared by replacing the third underlayers of the magnetic recording mediums of Examples 2-1 and 2-3 with the TaN layers and forming the other layers by using the same methods of Examples 2-1 and 2-3, respectively.

Regarding the thermally-assisted magnetic recording mediums of Comparative Examples 2-1 to 2-4 obtained as above, the coercive force and the SNR were measured using the same method in Example 1-1. The results are shown in Table 4.

TABLE 4

|  | First Under-layer | Second Under-layer | Third Under-layer | Coercive force (kOe) | SNR (dB) |
|---|---|---|---|---|---|
| Comparative Example 2-1 | Cr-20 at % V | MgO | MgO | 27.3 | 11.8 |
| Comparative Example 2-2 | Ru-50 at % Al | MgO | MgO | 28.1 | 11.9 |
| Comparative Example 2-3 | Cr-20 at % V | TaN | TaN | 24.9 | 11.3 |
| Comparative Example 2-4 | Ru-50 at % Al | TaN | TaN | 25.2 | 11.5 |

It was found from Table 4 that, when Comparative Examples 2-1 and 2-2 in which two MgO layers were formed as the underlayer and Comparative Examples 2-3 and 2-4 in which two TaN layers were formed as the underlayer were compared to Examples 2-1 and 2-3 including the TaN layer and the MgO layer shown in Table 3, the coercive force and the SNR were low.

The reason is presumed to be that the magnetic layer having a high orientation was obtained by arranging the TaN layer and the MgO layer having different lattice constants as the underlayer.

Examples 3-1 to 3-7

Figure 2:
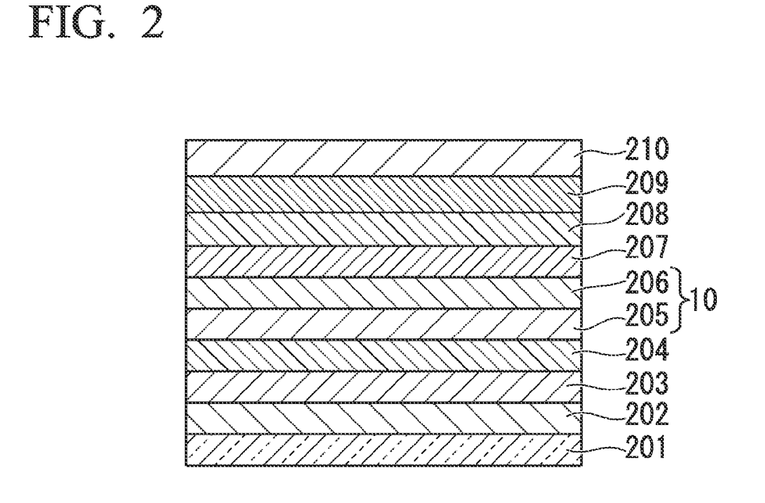
FIG. 2 is a cross-sectional view illustrating another example of the thermally-assisted magnetic recording medium according to the present invention.

Using the following method, the thermally-assisted magnetic recording medium illustrated in the cross-sectional schematic view of FIG. 2 was prepared.

First, an adhesive layer 202 composed of Cr-50 at % Ti and having a thickness of 40 nm, a heat sink layer 203 composed of Cu and having a thickness of 30 nm, and a seed layer 204 composed of Cr-50 at % Ti and having a thickness of 30 nm were formed on a 2.5-inch glass substrate 201 in this order.

Next, the substrate 201 was heated to 280° C. and a BCC underlayer 205 (orientation control layer; first underlayer) composed of Cr-20 at % Mo and having a thickness of 30 nm, a MgO underlayer 206 (second underlayer) composed of MgO and having a thickness of 5 nm, and a nitride underlayer 207 (third underlayer) composed of TaN and having a thickness of 5 nm were formed in this order.

Next, the substrate was heated to 680° C., a magnetic layer 208 formed of (Fe-55 at % Pt)-20 mol % $TiO_2$ and having a thickness of 8 nm was formed, a cap layer 209 composed of Co-10 at % Ta-5 at % B and having a thickness of 2 nm was formed, a protective film 210 formed of diamond like carbon (DLC) and having a thickness of 3.5 nm was formed thereon, and a liquid lubricant layer 211 composed of perfluoropolyether and having a thickness of 1.5 nm was coated thereon.

Through the above-described processes, a thermally-assisted magnetic recording medium of Example 3-1 was obtained.

Next, thermally-assisted magnetic recording mediums of Examples 3-2 to 3-7 were prepared by replacing the material of the BCC underlayer 205 (orientation control layer; first underlayer) of the thermally-assisted magnetic recording medium of Example 3-1 with Cr-5 at % Mo (Example 3-2), Cr-45 at % Mo (Example 3-3), Cr-15 at % Ti (Example 3-4), Cr-35 at % V (Example 3-5), Ru-50 at % Al (B2 underlayer; Example 3-6), and Ni-50 at % Al (B2 underlayer; Example 3-7), respectively, and forming the other layers by using the same method in Example 3-1.

The materials of the orientation control layers (first underlayers), the MgO underlayers (second underlayers), and the nitride underlayers (third underlayers) of Examples 3-1 to 3-7 are shown in Table 5.

TABLE 5

|  | First Under-layer | Second Under-layer | Third Under-layer | Coercive force (kOe) | SNR (dB) |
|---|---|---|---|---|---|
| Example 3-1 | Cr-20 at % Mo | MgO | TaN | 33.0 | 13.2 |
| Example 3-2 | Cr-5 at % Mo | MgO | TaN | 35.5 | 13.6 |
| Example 3-3 | Cr-45 at % Mo | MgO | TaN | 32.1 | 13.0 |
| Example 3-4 | Cr-15 at % Ti | MgO | TaN | 35.1 | 13.6 |
| Example 3-5 | Cr-35 at % V | MgO | TaN | 32.6 | 13.2 |
| Example 3-6 | Ru-50 at % Al | MgO | TaN | 34.8 | 13.5 |
| Example 3-7 | Ni-50 at % Al | MgO | TaN | 34.2 | 13.4 |

Comparative Examples 3-1 to 3-4

Thermally-assisted magnetic recording mediums of Comparative Examples 3-1 and 3-2 were prepared by forming layers, other than the nitride underlayers (third underlayers) of the thermally-assisted magnetic recording mediums of Examples 3-1 and 3-6, by using the same methods in Examples 3-1 and 3-6, respectively.

Thermally-assisted magnetic recording mediums of Comparative Examples 3-3 and 3-4 were prepared by forming layers, other than the MgO underlayers (second underlayers) of the thermally-assisted magnetic recording mediums of Examples 3-1 and 3-6, by using the same methods in Examples 3-1 and 3-6, respectively.

The materials of the orientation control layers (first underlayers), the MgO underlayers (second underlayers), and the nitride underlayers (third underlayers) of Comparative Examples 3-1 to 3-4 are shown in Table 6.

In addition, regarding the thermally-assisted magnetic recording mediums of Examples 3-1 to 3-7 and Comparative Examples 3-1 to 3-4, the coercive force and the SNR were measured by using the same method as that of Example 1-1. The results are shown in Tables 5 and 6.

TABLE 6

|  | First Under-layer | Second Under-layer | Third Under-layer | Coercive force (kOe) | SNR (dB) |
|---|---|---|---|---|---|
| Comparative Example 3-1 | Cr-20 at % Mo | MgO | — | 21.9 | 9.7 |
| Comparative Example 3-2 | Ru-50 at % Al | MgO | — | 21.0 | 9.4 |
| Comparative Example 3-3 | Cr-20 at % Mo | — | TaN | 21.7 | 9.5 |
| Comparative Example 3-4 | Ru-50 at % Al | — | TaN | 20.9 | 9.0 |

As shown in Table 5, irrespective of all the materials of the orientation control layers (first underlayers) shown in Table 5, the coercive force of the magnetic recording mediums of Examples 3-1 to 3-7 was high at 30 kOe or higher, the SNR was 13 dB or higher, and the coercive force and the SNR thereof were higher than those of the magnetic recording mediums of Comparative Examples 3-1 to 3-4 shown in Table 6. It was found from the above result that, in Examples 3-1 to 3-7 in which the orientation control layer, the nitride underlayer, and the MgO underlayer were provided and the nitride underlayer was formed on the MgO underlayer, the coercive force and the SNR can be improved.

In addition, as shown in Table 5, when the magnetic recording mediums of Examples 3-1 to 3-3 including the BCC underlayer (orientation control layer) formed of Cr—Mo were compared to each other, it was found that, the lower the content of Mo contained in the BCC underlayer, the higher the coercive force and the SNR.

Examples 4-1 to 4-6

A thermally-assisted magnetic recording medium of Example 4-1 was prepared by replacing the magnetic layer 208 of the thermally-assisted magnetic recording medium of Example 3-1 with a layer composed of (Fe-45 at % Pt)-18 mol % $SiO_2$. In addition, a thermally-assisted magnetic recording medium of Example 4-2 was prepared by replacing the orientation control layer (first underlayer) of the thermally-assisted magnetic recording medium of Example 4-1 with a layer composed of Ru-50 at % Al (B2 underlayer).

Thermally-assisted magnetic recording mediums of Examples 4-3 and 4-4 were prepared by replacing the nitride underlayers composed of TaN of the thermally-assisted magnetic recording mediums of Examples 4-1 and 4-2 with layers composed of NbN. Thermally-assisted magnetic recording mediums of Examples 4-5 and 4-6 were prepared by replacing the nitride underlayers formed of TaN of the thermally-assisted magnetic recording mediums of Examples 4-1 and 4-2 with layers formed of MN.

The materials of the orientation control layers (first underlayers), the MgO underlayers (second underlayers), and the nitride underlayers (third underlayers) of the thermally-assisted magnetic recording mediums of Examples 4-1 to 4-6 are shown in Table 7.

In addition, regarding the thermally-assisted magnetic recording mediums of Examples 4-1 to 4-6, the coercive force and the SNR were measured by using the same method in Example 1-1. Further, regarding the thermally-assisted magnetic recording mediums of Examples 4-1 to 4-6, the surface roughness (Ra) and the number of particles were measured using the same method as that of Example 2-1. The results are shown in Table 7.

As shown in Table 7, in all the nitride underlayers formed of TaN, NbN, and HfN, the coercive force and the SNR were high. In addition, it was found that the SNR of the mediums of Examples 4-1 and 4-2 in which the nitride underlayer was formed of TaN was higher than that of the mediums of Examples 4-3 to 4-6 in which the nitride underlayer was formed of NbN or MN. In addition, in the mediums of Examples 4-3 and 4-4 in which the nitride underlayer was formed of NbN, Ra was particularly low, and in the mediums of Examples 4-5 and 4-6 in which the nitride underlayer was formed of HfN, the number of particles was particularly small. Based on the above results, the kind of a nitride used in the nitride underlayer can be selected according to the requirements for the magnetic recording medium.

Example 5

When each of the thermally-assisted magnetic recording mediums of Examples 1-1 to 1-5, 2-1 to 2-9, and 4-1 to 4-6 and Comparative Examples 1-1 to 1-11 and 2-1 to 2-4 was used as the magnetic recording medium of the magnetic recording and reproducing apparatus illustrated in FIG. 3, the error rate thereof was measured.

The error rate was recorded and measured under the conditions of a linear recording density of 1600 kFCl and a track density of 500 kFCl (a surface recording density of 800 Gbit/$inch^2$).

As a result, the magnetic recording and reproducing apparatuses into which the thermally-assisted magnetic recording mediums of Examples 1-1 to 1-5, 2-1 to 2-9, and 4-1 to 4-6 were incorporated showed a low error rate of $1 \times 10^{-7}$ or lower. In addition, the magnetic recording and reproducing apparatuses into which the thermally-assisted magnetic recording mediums of Comparative Examples 1-1 to 1-11 and 2-1 to 2-4 were incorporated showed an error rate of about $1 \times 10^{-4}$.

It was found from the above results that a magnetic recording and reproducing apparatus having a low error rate can be obtained by using the thermally-assisted recording mediums of Examples according to the present invention in which the orientation control layer, the MgO underlayer that contains MgO and has a (100) orientation, and the nitride underlayer that contains at least one nitride selected from the group consisting of TaN, NbN, and HfN and has a (100) orientation are provided on the surface.

According to the present invention, it is possible to provide: a thermally-assisted magnetic recording medium hav-

TABLE 7

| | First Underlayer | Second Underlayer | Third Underlayer | Coercive force (kOe) | SNR (dB) | Ra (nm) | Number of Particles |
|---|---|---|---|---|---|---|---|
| Example 4-1 | Cr—20 at % Mo | MgO | TaN | 36.3 | 13.4 | 0.22 | 85 |
| Example 4-2 | Ru—50 at % Al | MgO | TaN | 37.8 | 13.6 | 0.23 | 92 |
| Example 4-3 | Cr—20 at % Mo | MgO | NbN | 35.1 | 12.7 | 0.16 | 79 |
| Example 4-4 | Ru—50 at % Al | MgO | NbN | 35.7 | 13.0 | 0.18 | 88 |
| Example 4-5 | Cr—20 at % Mo | MgO | HfN | 35.2 | 12.8 | 0.22 | 29 |
| Example 4-6 | Ru—50 at % Al | MgO | HfN | 35.6 | 13.0 | 0.24 | 31 | ing high coercive force and high signal-to-noise ratio (SNR); and a magnetic recording and reproducing apparatus including the same.

EXPLANATION OF REFERENCES

101: SUBSTRATE
102: ADHESIVE LAYER
103: HEAT SINK LAYER
104: SEED LAYER
105: BCC UNDERLAYER (ORIENTATION CONTROL LAYER)
106: NITRIDE UNDERLAYER (UNDERLAYER)
107: MgO UNDERLAYER (UNDERLAYER)
108: MAGNETIC LAYER
109: PROTECTIVE FILM
110: LUBRICANT LAYER
201: SUBSTRATE
202: ADHESIVE LAYER
203: HEAT SINK LAYER
204: SEED LAYER
205: BCC UNDERLAYER (ORIENTATION CONTROL LAYER)
206: MgO UNDERLAYER (UNDERLAYER)
207: NITRIDE UNDERLAYER (UNDERLAYER)
208: MAGNETIC LAYER
209: CAP LAYER
210: PROTECTIVE FILM
211: LUBRICANT LAYER
301: MAGNETIC RECORDING MEDIUM
302: MEDIUM-DRIVING UNIT
303: MAGNETIC HEAD
304: HEAD-MOVING UNIT
305: RECORDING AND REPRODUCING SIGNAL PROCESSING SYSTEM
401: MAIN MAGNETIC POLE
402: AUXILIARY MAGNETIC POLE
403: COIL
404: LASER DIODE
405: LASER LIGHT
406: NEAR-FIELD LIGHT-GENERATING ELEMENT
407: WAVEGUIDE
408: RECORDING HEAD
409: SHIELD
410: REPRODUCING ELEMENT
411: REPRODUCING HEAD

What is claimed is:

1. A magnetic recording medium, comprising:
an orientation control layer that is formed on a substrate;
an underlayer that is formed on the orientation control layer; and
a magnetic layer that is formed on the underlayer and contains an alloy having an $L1_0$ type crystal structure as a main component,
wherein the underlayer includes an MgO underlayer that contains MgO and has a (100) orientation and a nitride underlayer that contains at least one nitride selected from the group consisting of TaN, NbN, and HfN and has a (100) orientation, and
recording is performed by using thermally-assisted magnetic recording method or microwave-assisted magnetic recording method.

2. The magnetic recording medium according to claim 1, wherein the MgO underlayer is formed on the nitride underlayer.

3. The magnetic recording medium according to claim 1, wherein the nitride underlayer is formed on the MgO underlayer.

4. The magnetic recording medium according to claim 1, wherein the orientation control layer includes a (100)-oriented BCC underlayer that contains Cr, Mo, Nb, Ta, V, W, or Cr as a main component and has a BCC structure containing at least one element selected from the group consisting of Mn, Mo, Ru, Ti, V, and W.

5. The magnetic recording medium according to claim 1, wherein the orientation control layer includes a B2 underlayer that has a B2 structure consisting of NiAl or RuAl.

6. The magnetic recording medium according to claim 1, wherein the magnetic layer contains a FePt alloy or a CoPt alloy having an $L1_0$ type crystal structure as a main component and contains at least one oxide or element selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, and C.

7. A magnetic recording and reproducing apparatus, comprising:
the magnetic recording medium according to claim 1;
a medium-driving unit that drives the magnetic recording medium in a recording direction;
a magnetic head that includes a laser-generating unit, a waveguide, and a near-field light-generating element and performs a recording operation and a reproducing operation on the magnetic recording medium, in which the laser-generating unit heats the magnetic recording medium, the waveguide guides laser light, which is generated from the laser-generating unit, to a tip end portion, and the near-field light-generating element is provided in the tip end portion;
a head-moving unit that moves the magnetic head relative to the magnetic recording medium; and
a recording and reproducing signal-processing system that inputs a signal to the magnetic head and reproduces a signal output from the magnetic head.

8. A magnetic recording and reproducing apparatus, comprising:
the magnetic recording medium according to claim 1;
a medium-driving unit that drives the magnetic recording medium in a recording direction;
an element that irradiates the magnetic recording medium with microwaves;
a magnetic head that performs a recording operation and a reproducing operation on the magnetic recording medium;
a head-moving unit that moves the magnetic head relative to the magnetic recording medium; and
a recording and reproducing signal-processing system that inputs a signal to the magnetic head and reproduces a signal output from the magnetic head.

9. The magnetic recording medium according to claim 1, wherein the thickness of the nitride underlayer is in a range of 0.5 nm to 30 nm.

* * * * *